United States Patent [19]

McIntire, III

[11] Patent Number: 4,660,610

[45] Date of Patent: Apr. 28, 1987

[54] INSULATING DEVICE FOR HEATED WORKING TOOLS SUCH AS WELDING TORCHES AND THE LIKE

[75] Inventor: Dana L. McIntire, III, Brunswick, Mass.

[73] Assignee: Bath Iron Works Corporation, Bath, Me.

[21] Appl. No.: 757,287

[22] Filed: Jul. 22, 1985

[51] Int. Cl.⁴ .................... A45C 11/00; B65D 81/18
[52] U.S. Cl. .................................. 150/52 R; 206/349
[58] Field of Search ............... 150/52 R, 52 G, 52 H; 206/349; 224/904, 234; 219/242

[56] References Cited

U.S. PATENT DOCUMENTS

| D. 266,048 | 9/1982 | Zills | 150/52 R X |
|---|---|---|---|
| 1,758,775 | 5/1930 | Abbott | 219/242 X |
| 2,172,682 | 9/1939 | Rauba | 219/242 X |
| 2,575,118 | 11/1951 | Pattison | 150/52 R |
| 2,985,552 | 5/1961 | Watanabe | 150/52 R X |
| 3,589,971 | 6/1971 | Reed | 150/52 R X |
| 3,593,769 | 7/1971 | Spears | 150/52 G |
| 3,831,652 | 8/1974 | Hyden et al. | 150/52 G |
| 3,938,570 | 2/1976 | Stewart | 150/52 G |
| 3,965,955 | 6/1976 | Price | 150/52 G |
| 4,142,565 | 3/1979 | Plunkett, Sr. | 150/52 R |

* FOREIGN PATENT DOCUMENTS 2143431 2/1985 United Kingdom ............. 150/52 R

Primary Examiner—William Price
Assistant Examiner—Sue A. Weaver
Attorney, Agent, or Firm—Shlesinger, Arkwright, Garvey & Fado

[57] ABSTRACT

An insulating device is disclosed as suitable for encasing and supporting a welding torch. The device is L-shape when finally assembled being formed by two T-shape panel members of closely woven fabric material. These panels are stitched along their contiguous edges and then folded to form an L-shape pouch or glove for the torch, the folded sections being held by heat conductive rings which serve to conduct heat from the stitching material. The folded sections are arranged to provide a corner opening for permitting the ingress and egress of the torch to the interior of the device.

13 Claims, 6 Drawing Figures

U.S. Patent  Apr. 28, 1987  Sheet 1 of 2  4,660,610
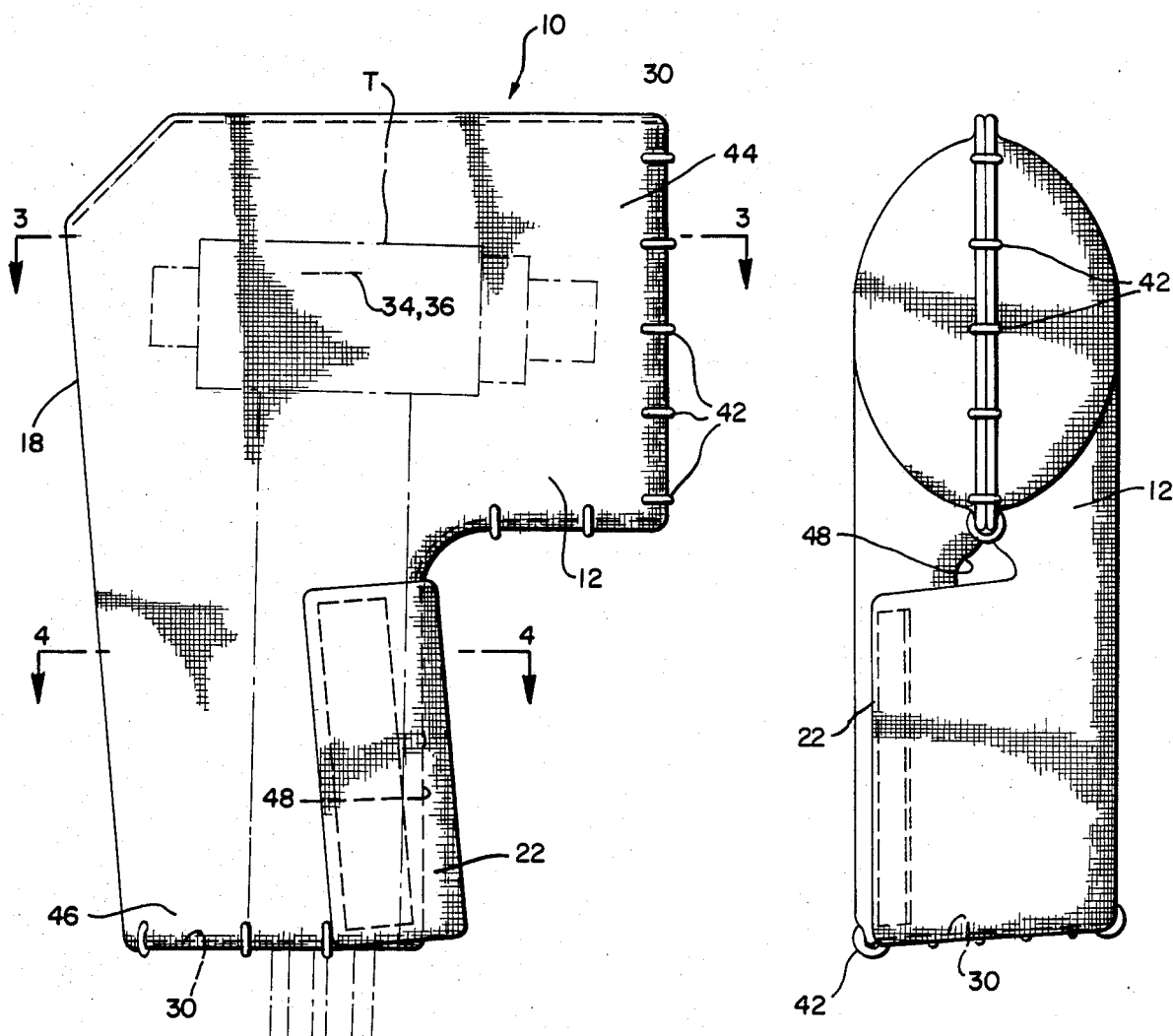
FIG 1
FIG 2
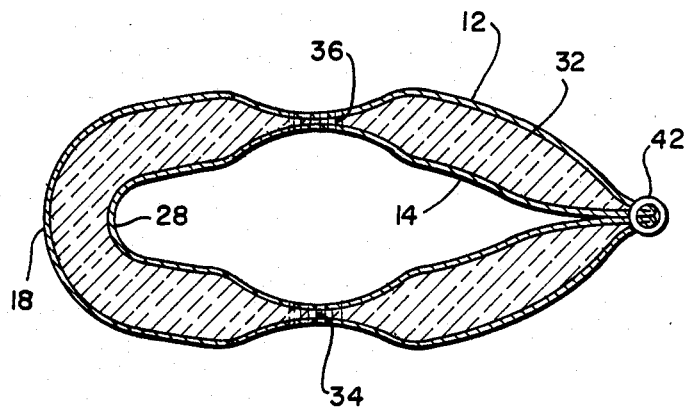
FIG 3
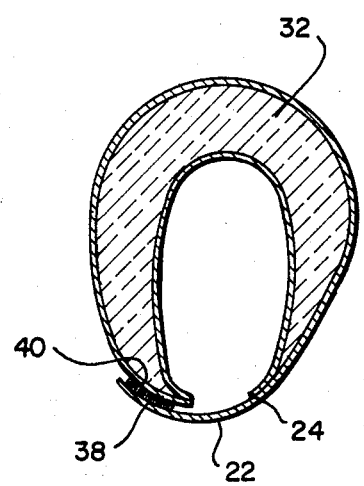
FIG 4

INSULATING DEVICE FOR HEATED WORKING TOOLS SUCH AS WELDING TORCHES AND THE LIKE

This invention is related to an insulating device such as a pouch or a glove devised for permitting the quick ingress and egress of hot working tools such as welding or cutting torches.

HISTORICAL BACKGROUND

One of the most perplexing problems facing a welder or cutter in the practice of his art is the need to be able to stow a hot welding or cutting torch momentarily during short periods of non-welding operation to permit him to attend to incidental matters. Such matters may include the need to inspect his previously applied welding or cut work, to move about his work area for better body positioning and/or work conditioning, to secure additional working materials such as welding rods or other work-pieces to be applied to the work function, or to permit time and freedom of hands during which to monitor working directions by way of blueprints, or to discuss matters with other personnel who may be related to the job. This problem becomes much more acute when the welder is performing his job at high elevations such as on scaffoldings applied to high buildings under construction or repair, or to relatively large shipping vessels. These same problems become more acute to the welder or cutter who is working in an environment which is not readily accessible for any length of time and/or which require assuming precarious positions relative to the work and to safety precautions.

In all these situations there is the repeated need to disengage the working operation of the torch from the work being attended to and to relocate the torch momentarily to permit the welder to engage in the referred-to matters. This momentarily setting aside the torch has presented many problems during these enumerated situations. In many cases the torches simply fall from scaffordings or from other working platforms positioned at high levels, such as catwalks and ladders, thereby resulting in the torches becoming completely disabled. In many situations a torch which has been laid upon a supporting surface has caused fires or at least has damaged surrounding materials and structure. Setting aside the torch in this manner has caused injuries for both the welder in attempting to retrieve the torch or to nearby personnel who may receive injuries because of fallen torches, or who unknowingly grasps hot torches.

Heretofore, no specific arrangement was devised for containing a welding torch for momentary storage in close vicinity of the welder who intends to resume work with the welding torch. A pouch for tools as disclosed in U.S. Pat. No. 2,822,848 lacks the specific adaptation for permitting the quick ingress and egress of a hot tool. This disadvantage is also present in the jacket disclosed in U.S. Pat. No. 2,482,322. The shape of the models adapted for this type of jacket is relatively simple and will not adapt to a many sided welding torch, particularly that of the plasma jet type. The insulation assembly disclosed in the U.S. Pat. No. 3,941,159 is devised simply for a tubular pipe, a very simple shape to accommodate. The insulating device disclosed in U.S. Pat. No. 4,142,565 is devised to accommodate a many sided object such as a faucet. However, the disclosed device is constructed and arranged to be applicable to a faucet and then be maintained thereon for some period of time. There is no provision for the quick ingress and egress of an object nor the prevention of the effect of extreme heat to some materials of the device.

OBJECTS AND SUMMARY

The present invention is directed to the problems enumerated above, particularly relative to hot welding torches and has been devised as an insulating device resembling a pouch or glove which is particularly shaped to accommodate the welding torch. The device is formed generally by two T-shaped panels stitched together along their contiguous edges and folded symmetrically about a line to provide L-shaped sections. The folded configuration provides a corner opening through which the hot torch may be inserted and held therein while in temporary storage to permit the user to attend to other duties. Heat sinks are provided along certain portions of the device to assist in carrying away some of the heat from the critical points of the device such as stitching and the like.

Therefore, the principal object of the present invention is to secure temporarily a hot working tool such as a welding torch which will insulate surrounding objects from the heat derived from the torch.

Another object of the invention is to permit the temporary storage of a very hot working tool and yet permit the quick access to the tool upon resumption of working need for the same.

Still another object of the invention is to permit handling of a hot working tool while the same is in a nonworking state, utilizing a minimum of parts of low price materials.

In summary, this invention relates to an insulating device particularly adapted to hot welding or cutting torches particularly of the plasma jet type, which device is formed by the folding of a stitched pair of panels, and designed to accept a torch therebetween quickly and easily.

These and other objects of the invention will become apparent from the following description and claims.

DESCRIPTION OF THE DRAWINGS

In the accompanying drawings which illustrate by way of example a preferred embodiment of the invention:

FIG. 1 is a front elevational view of the insulating device of the present invention showing a hot working tool such as a plasma jet torch supported therein;

FIG. 2 is a side elevational view of the insulating device;

FIG. 3 is a cross section of the insulating device taken along lines 3—3 in FIG. 1;

FIG. 4 is a cross section of the device taken along lines 4—4 in FIG. 1;

OPERATION

Figure 5:
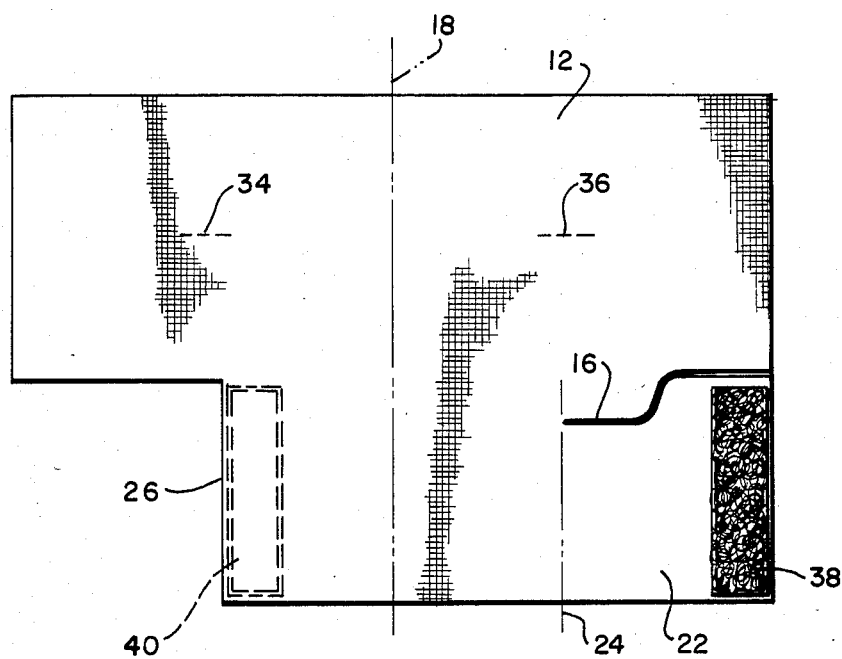
FIG. 5 is a blank of the exterior panel of the insulating device showing its generally L-shape configuration before assembly thereof.

The insulating device of the present invention as shown in FIG. 1 is generally indicated by the reference numeral 10 and comprises a panel 12, initially being formed of L-shape configuration but during fabrication assumes a T-shape, and a T-shaped panel 14. As a unitary structure, as shown in FIGS. 1 and 2, the device is adapted to encase and support a hot working tool, such as a cutting or welding torch T. The panel 12 serves as the exterior cover for the device 10 while the panel 14 serves as the interior panel therefor.

Figure 6:
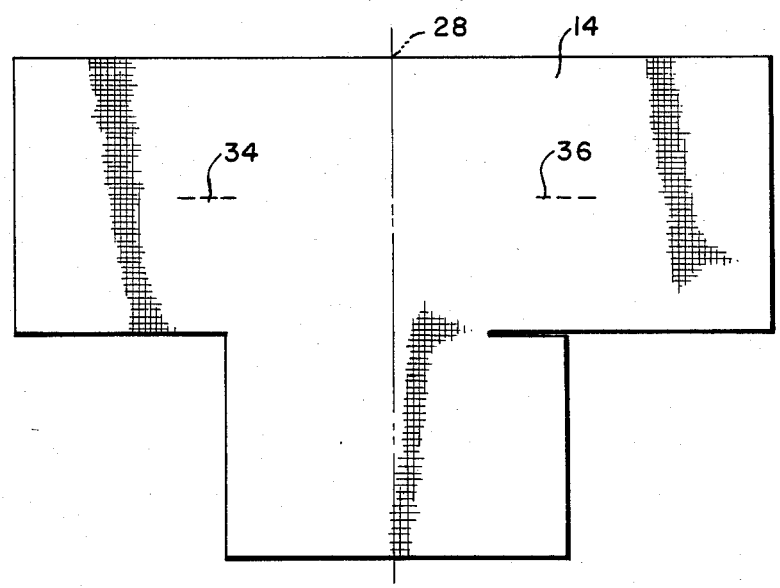
FIG. 6 is a blank of the interior panel of the insulating device showing its generally T-shape configuration and its approximate size relative to the exterior panel.

The outer panel 12, as previously stated, is L-shaped; however, before assembly, during the fabrication of the device 10, the panel 12 is cut along a line 16, the cut starting along one side edge of the panel and terminating at a point approximately symmetrical with the opposite edge of the panel relative to a line 18 which generally bisects the panel longitudinally. The cut 16 thereby provides a flap portion 22 which may be softly folded around a line 24 until the outer edge of the flap is brought around to overlap slightly an edge portion 26 formed on the opposite edge of the panel 12. As shown in FIG. 6, the panel 14 is generally the same size and shape as the panel 12, except for the flap 22, and during fabrication, the panels are brought together with the edges of each panel placed contiguous with the edges of the other panel. The panel 14 is illustrated with a dashed line 28 which generally bisects the panel longitudinally. In forming the device 10, the panels are softly folded about the lines 18, 28, as shown in FIG. 3, resulting in the device having the final L-shape configuration of FIG. 1.

The panels 12 and 14 are sewn together by suitable stitching material along their entire contigous edge except for the flap 22. The stitching 30 is shown in dashed lines in FIGS. 1 and 2 as extending along the top of the device 10 along the edge of the device opposite that of the folding lines 18, 28 and along the bottom of the device. The space between the panels 12, 14 when assembled to form the insulating device 10 is filled with fiberglass batting 32, to the extent generally illustrated in FIGS. 3 and 4. Suitable spot-applied stitches, 34 and 36 between the panels are provided in order to endow the insulating device with compactness. The panels themselves preferably are made of canvas duck material which provides strength and rigidity for the insulating device. It will be understood that other relatively thick and closely woven material capable of supporting heavy and hot tools may be utilized. However, such material must be capable of maintaining a relatively rigid form when the device has been assembled. When assembled as described in the foregoing, and with the material selected, it is imperative that the device be able to maintain its shape regardless of whether a tool has been applied thereto in order to eliminate the prospect that the user may spend time and effort to condition the device for the insertion of a tool to be stowed.

Quickly releasable material, such as "Velcro" material, may be applied to the flap 22 adjacent the free edge thereof. The hooks 38 of the material cooperate with the corresponding loop piles 40 of the material applied to the opposite edge of the panel 12 along the edge 26. As shown in FIG. 4, the material 38, 40 serve to hold the flap 22 against the opposite portions of the panel 12 for a purpose to be described hereinafter.

To complete the structure of the insulating device 10, a number of metallic rings 42 are applied to some of the stitched edge portions of the panels 12 and 14, and join these edges as shown in FIGS. 1-3 to hold the L-shape sections of the panels 12, 14 as the completed structure of the device 10. The rings 42 are of high conductivity which serve to conduct heat away from adjacent stitching material to prevent the same from damage due to the heat radiating from the torch T. The L-sections of the device 10, as shown in FIGS. 1 and 2, are joined by the rings 42 at one leg 44 of the assembled unit structure and along the inner edges of that leg. The rings 42 are also applied to the stitched end of each of the other legs of the L-sections but do not join these edges. With this latter arrangement, then, the lower nonjoined edges on the other legs, illustrated in FIG. 1 at 46, provide a corner opening so formed when combined with the opening 48 between the edges of the L-sections adjacent the non-joined edges 46, to permit the easy and quick ingress and egress of a welding torch T within the device 10.

In operation, the device 10 may be carried by a suitable hanger or strap to the user or upon a work stand. In this position, the flap 22 is disengaged from the edge 26 thereby presenting a corner opening defined by the non-joined edges at 46 and the opening 48. When the need arises, the user directs the torch T through the corner opening to its position shown in FIG. 1. The flap 22 is next folded to cover the opening 48 by the material 38 applied to the material 40 for permitting the positive, forceful gripping of the flap 22 to the other L-section associated therewith. In this manner, the torch T is locked in the position shown, to be stored therein until removed by the reverse of the described operative steps. While so stored, the hot torch is out of reach from inadvertent manual touching and is secured against falling or being displaced.

From the foregoing, it will be appreciated that the insulating device of the present invention provides a rugged boot or glove for a hot welding tool. The device is devised so that a user has quick access to the interior thereof to allow him to insert the torch therein easily when not in use and to remove the tool quickly when a welding operation is resumed. It will also be appreciated that the device is adapted to protect the nearby environment and the user from the excessive heat generated from a torch immediately after use. While in the device, the torch is protected from falling and causing damage to itself and any object in its path of fall.

Therefore, while the invention has been described in connection with particular arrangements and operations thereof, no limitation is intended thereby except as defined in the following claims.

While this invention has been described as having a preferred design, it will be understood that it is capable of further modification. This application, is therefore, intended to cover any variations, uses, or adaptations of the invention vollowing the general principles thereof and including such departures from the present disclosure as come within known or customary practice in the art to which this invention pertains, and as may be applied to the essential features hereinbefore set forth and fall within the scope of this invention or the limits of the claims.

What is claimed is:

1. A protective cutting or welding torch glove or the like for covering the head and a shank portion of a torch comprising:
   (a) a sleeve having a closed end and an open end,
   (b) said closed end covering the head of said torch,
   (c) a slot in said sleeve extending upwardly from said open end a substantial distance toward said closed end and positionable in the area of said shank portion of said torch,
   (d) said glove having inner and outer insulation panels having secured mating peripheral portions, (e) said glove having releasable securing means for maintaining said slot closed when said torch is confined in said glove, (f) insulation cushioning material disposed between and confined by said panels, and (g) heat radiating means on at least some of said peripheral mating portions for radiating heat from said torch head through said glove and to the ambient atmosphere.

2. A protective cutting or welding torch glove as in claim 1 and wherein:

(a) said secured mating peripheral portions are stitched, and (b) said heat radiating means encompasses portions of said peripheral mating portions.

3. A protective cutting or welding torch glove as in claim 2 and wherein:

(a) said heat radiating means are ring clips.

4. A protective cutting or welding torch glove as in claim 3 and wherein:

(a) said ring clips are positioned at said sleeve open end and in the closed end in the area of said torch head.

5. A protective cutting or welding torch glove as in claim 4 and wherein:

(a) said panels are stitched together at points remote from said peripheral portions for compacting said insulation cushioning material at said remote points for restricting bulging of said glove.

6. An insulating device for encasing and supporting a hot working tool such as a welding torch and the like, comprising:

(a) first outer and second inner panel members defining the exterior and interior walls of the device respectively, and each of said panel members having peripheral edges, and each panel being generally T-shaped with its edges contiguous to the edges of the other panel, and each of said panels having a vertical center line;

(b) securing means applied along said edges thereby forming a unitary, multiple-layered structure;

(c) insulating material positioned between said panels and being retained therebetween by said securing means;

(d) said panel members being folded along their vertical center line with said first outer panel member encompassing said second inner panel member and when folded defining a pair of L-shaped sections generally symmetrical about said center line thereby presenting overlapping secured edges of said sections;

(e) said L-shaped sections each having horizontal and vertical legs;

(f) said vertical legs having a bottom edge and an inner side edge;

(g) means for joining the secured edges of said L-shaped sections except for said bottom edge of said adjacent vertical legs of said section and a portion of said inner side edges of said adjacent legs thereby leaving an opening at one end of the joined sections and said portions of said side edges thereof for the ingress and egress of a hot working tool; and, (h) said means for joining said secured edges comprising heat radiating means affixed to at least a portion of said joined edges to conduct heat therefrom during retension of the tool within said structure.

7. The insulating device of claim 6 including:

(a) a flap connected to one of said L-shaped sections of said first outer panel and arranged to overlap said opening formed between said inner side edges of said vertical legs.

8. The insulating device of claim 7 including:

(a) a means for releasably securing said flap to said other of said L-shaped section of said first outer panel.

9. The insulating device of claim 8 and wherein:

(a) said means for releasably securing said flap to said other of said L-shaped sections of said first outer panel include "Velcro" material.

10. The insulating device of claim 6 and wherein:

(a) said first outer and said second inner panel members being formed from closely woven fabric material.

11. The insulating device of claim 6 wherein said heat radiating means is in the form of metallic rings.

12. The insulating device of claim 10 wherein said fabric material comprises canvas duck.

13. The insulating device of claim 6 wherein said insulating material comprises fiberglass batting.

* * * * *

UNITED STATES PATENT AND TRADEMARK OFFICE
CERTIFICATE OF CORRECTION

PATENT NO. : 4,660,610

DATED : April 28, 1987

INVENTOR(S) : Dana L. McIntire, III

It is certified that error appears in the above-identified patent and that said Letters Patent is hereby corrected as shown below: Title page:

[75] Inventor: Dana L. McIntire, III
                Brunswick, Maine

Signed and Sealed this

Twenty-ninth Day of December, 1987

Attest:

DONALD J. QUIGG

*Attesting Officer*           *Commissioner of Patents and Trademarks*